US006395180B2

(12) United States Patent
Chioini et al.

(10) Patent No.: US 6,395,180 B2

(45) Date of Patent: May 28, 2002

(54) METHOD AND APPARATUS FOR PREPARING LIQUID DIALYSATE

(75) Inventors: Robert L. Chioini, West Bloomfield, MI (US); Charles E. Newhouse, Washington, IA (US)

(73) Assignee: Rockwell Medical Technologies, Inc., Wixom, MI (US)

(*) Notice: Subject to any disclaimer, the term of this patent is extended or adjusted under 35 U.S.C. 154(b) by 0 days.

(21) Appl. No.: 09/810,770

(22) Filed: Mar. 16, 2001

Related U.S. Application Data

(63) Continuation of application No. PCT/US99/21512, filed on Sep. 17, 1999.

(60) Provisional application No. 60/100,980, filed on Sep. 18, 1998.

(51) Int. Cl.[7] .............................................. B01D 61/26

(52) U.S. Cl. ......................... 210/646; 137/88; 210/86; 210/104; 210/542; 210/647; 210/744; 366/136; 366/153.1

(58) Field of Search ......................... 210/86, 96.1, 101, 210/104, 194, 257.1, 321.71, 321.72, 542, 646, 647, 744; 137/88, 136; 366/137, 152.1, 152.2, 153.1; 604/4.01, 5.01

(56) References Cited

U.S. PATENT DOCUMENTS 3,653,640 A * 4/1972 Dehaas
4,489,535 A * 12/1984 Veltman ..................... 210/646
4,571,092 A 2/1986 Switall
4,655,941 A * 4/1987 Suzuki
4,734,198 A * 3/1988 Harm et al. ................ 210/647
4,756,838 A * 7/1988 Veltman ..................... 210/646
4,784,495 A 11/1988 Jonsson et al.
4,812,239 A * 3/1989 Mills et al. ................. 210/647
5,252,213 A * 10/1993 Ahmad et al. .............. 210/542
5,511,875 A * 4/1996 Jonsson et al. .......... 366/153.1

* cited by examiner

*Primary Examiner*—Joseph W. Drodge
(74) *Attorney, Agent, or Firm*—Price, Heneveld, Cooper, DeWitt & Litton

(57) ABSTRACT

An apparatus for preparing dialysate concentrate includes a vessel, a controllable valve for regulating water flow to the vessel, a first sensing device for detecting when the liquid has reached a lower level, a second sensing device for detecting when the liquid has reached an upper level, a controller selectively responsive to one of the sensing devices, and a positionable switch for selecting to which of the sensing devices the controller is responsive. The apparatus can be used in a method for preparing a dialysate concentrate by connecting a source of water to an inlet port, filling the vessel to the predetermined lower level by positioning the switch so that the controller is responsive to the first sensing device, opening the controllable valve, allowing the first sensing device to detect when the predetermined lower level has been reached and close the valve, adding a predetermined amount of powder and/or liquid to the vessel, agitating the contents of the vessel for a time sufficient to cause the added powder and/or liquid to dissolve into and/or mix with the water in the vessel to form a homogenous solution, filling the vessel to the upper level by positioning the switch so that the controller is responsive to the second sensing device, opening the valve, and allowing the second sensing device to detect when the upper level has been reached and close the valve.

15 Claims, 5 Drawing Sheets

METHOD AND APPARATUS FOR PREPARING LIQUID DIALYSATE

CROSS-REFERENCE TO RELATED APPLICATIONS

This application is a continuation of PCT International Application No. PCT/US99/21512, entitled "METHOD AND APPARATUS FOR PREPARING LIQUID DIALYSATE" which was filed in the United States on Sep. 17, 1999, designating the United States of America, and was published in English on Mar. 30, 2000, the entire disclosure of which is hereby incorporated by reference, and which claims priority to U.S. Provisional Patent Application No. 60/100,980 entitled "METHOD AND APPARATUS FOR PREPARING LIQUID DIALYSATE" which was filed Sep. 18, 1998, the entire disclosure of which is hereby incorporated by reference.

FIELD OF THE INVENTION

This invention relates to an apparatus and method for preparing fluids used for dialysis procedures.

BACKGROUND OF THE INVENTION

Dialysis is a procedure for removing waste products from the blood of a patient when the kidneys are unable to do so on their own. Hemodialysis is a form of dialysis in which waste products are directly removed from the blood. The blood of a patient suffering from impaired kidney function is conducted along one side of a permeable membrane in a dialyzer device, while dialysis fluid is conducted along the opposite side of the same membrane. The waste materials that are to be removed from the blood pass with the help of diffusion from the blood of the patient to the dialysis fluid through the permeable membrane.

The dialysate is an aqueous acetic solution which contains various electrolytes. The dialysate generally contains sodium chloride, potassium chloride, calcium chloride, acetate ions, dextrose and other constituents in the same concentration as normal plasma. Urea, creatinine, uric acid phosphate and other metabolites normally eliminated by the kidneys diffuse from the blood of the patient into the dialysate until the concentration of these compounds are the same in the blood and in the dialysate. The volume of dialysate fluid used is much greater than the blood volume. The great disparity in volume and the replenishment of dialysate with fresh fluid insure that the metabolites and excess electrolytes are removed almost completely from the blood.

The dialysate is generally prepared from a dialysate concentrate (which contains sodium ions, potassium ions, calcium ions, magnesium ions, chloride ions, acetate ions, and dextrose), a bicarbonate solution and water. The dialysate concentrate, bicarbonate solution and water are generally combined at, or by, the dialysis machine.

Dialysate concentrates are generally prepared in centralized preparation plants and are then transported to the point of treatment in large kegs or other containers (typically 55-gallon drums). As a result, hospitals or other facilities performing hemodialysis procedures must devote a considerable amount of space for storage of dialysate concentrate. A further disadvantage with the currently prevalent practice of having the dialysate concentrate prepared at a centralized preparation plant and transported to the point of treatment in large containers, rather than preparing the dialysate concentrate at the point of treatment, is the relatively higher costs associated with shipping large containers of dialysate concentrate from the centralized preparation plants to the point of treatment.

As an alternative, dialysate concentrates have been prepared at the point of treatment. These methods have involved combining powders and/or highly concentrated liquid solutions with water in a mixing vessel to form the dialysate concentrate. Although such methods can significantly reduce transportation costs and storage space requirements, they have not been favored because of the relative difficulty involved in accurately combining the powders and/or highly concentrated liquids with the appropriate amount of water, and completely dissolving the electrolytes using conventional mixing apparatuses.

U.S. Pat. No. 4,784,495 discloses a system for preparing a fluid intended for a medical procedure substantially at the time of use. The system includes a reservoir for a source of water, at least one vessel containing a concentrate in powder form, and a concentrate fluid circuit for withdrawing a small quantity of water from the reservoir and passing the water through the vessel containing the concentrate in powder form in order to dissolve the concentrate to produce a concentrate fluid, and for then conducting the concentrate fluid to a primary fluid circuit communicating with the reservoir so that the produced concentrate fluid is mixed with the rest of the water withdrawn from the reservoir. Although this apparatus can reduce storage requirements for dialysate concentrates, and appears to be relatively easy to operate, it is a relatively complicated and expensive apparatus.

Accordingly, there remains a need for a simple, relatively inexpensive, easy-to-operate apparatus for preparing dialysate concentrates from dry powders and/or highly concentrated liquid solutions at the point of use to reduce storage requirements and transportation costs.

SUMMARY OF THE INVENTION

The present invention provides a simple, inexpensive apparatus for preparing a dialysate concentrate for use in performing a dialysis procedure. The apparatus includes a vessel, a liquid inlet port to the vessel, an automatically controllable valve for regulating water flow through the inlet port into the vessel, first and second sensing devices for detecting when the liquid has reached a lower liquid level and an upper liquid level respectively, a controller selectively responsive to one of the sensing devices for closing the automatically controllable valve when a selected one of the first and second sensing devices detects that the liquid has reached the lower or upper liquid level respectively, and a switch for selecting to which of the sensing devices the controller is responsive.

The method includes the steps of connecting a source of water to the inlet port, filling the vessel to the predetermined lower liquid level by positioning the switch so that the controller is responsive to the first sensing device and opening the automatically controllable valve, allowing the first sensing device to detect when the predetermined lower liquid level has been reached and signal the controller to shut the automatically controllable valve, adding a predetermined amount of a powder and/or highly concentrated liquid to the vessel, operating the agitator for a period of time sufficient to cause the added powdered and/or highly concentrated liquid to dissolve into and/or mix with the water in the vessel to form a homogeneous solution, filling the vessel to the predetermined upper liquid level by positioning the switch so that the controller is responsive to the second sensing device and opening the automatically controllable valve, and allowing the second sensing device to detect when the predetermined upper liquid level has been reached and signal the controller to shut the automatically controllable valve.

In one aspect of the invention, a dialysate concentrate is prepared from a pre-measured package of dry ingredients and a pre-measured amount of an acid solution.

The invention also provides a simplified method for using the apparatus for preparing a dialysate concentrate. The method and apparatus of the invention are cost effective, save time, decrease storage space requirements, and facilitate easy preparation of dialysate concentrate at the point of use. The apparatus is highly portable, and relatively small and lightweight, so that it can be easily set-up and used at relatively small facilities, such as small clinics. The apparatus is easy to use and can be operated by an individual, without any additional assistance.

DESCRIPTION OF PREFERRED EMBODIMENT

Figure 1:
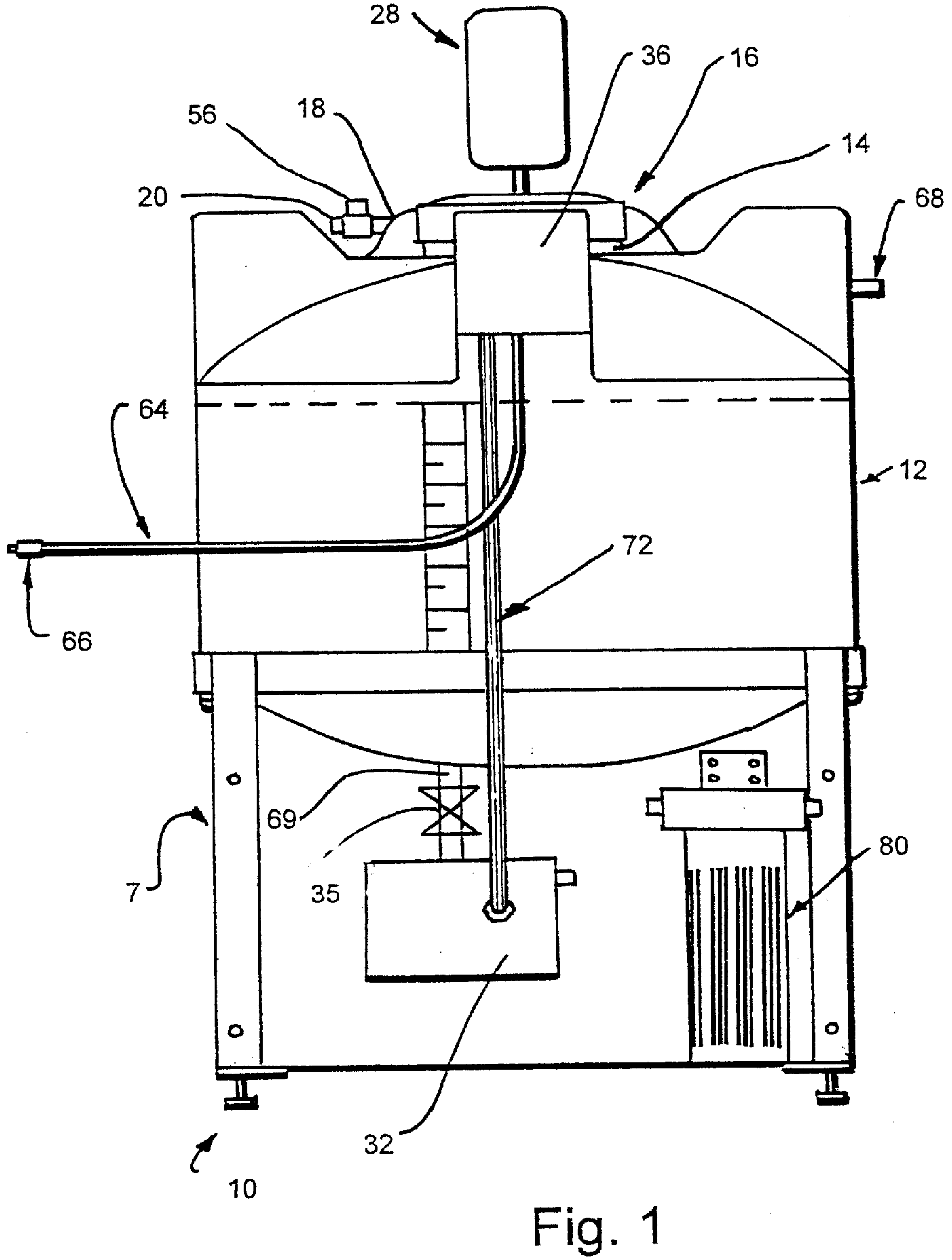
FIG. 1 is a front elevational view of an apparatus for preparing a dialysate concentrate for use in performing a dialysis procedure.
Figure 3:
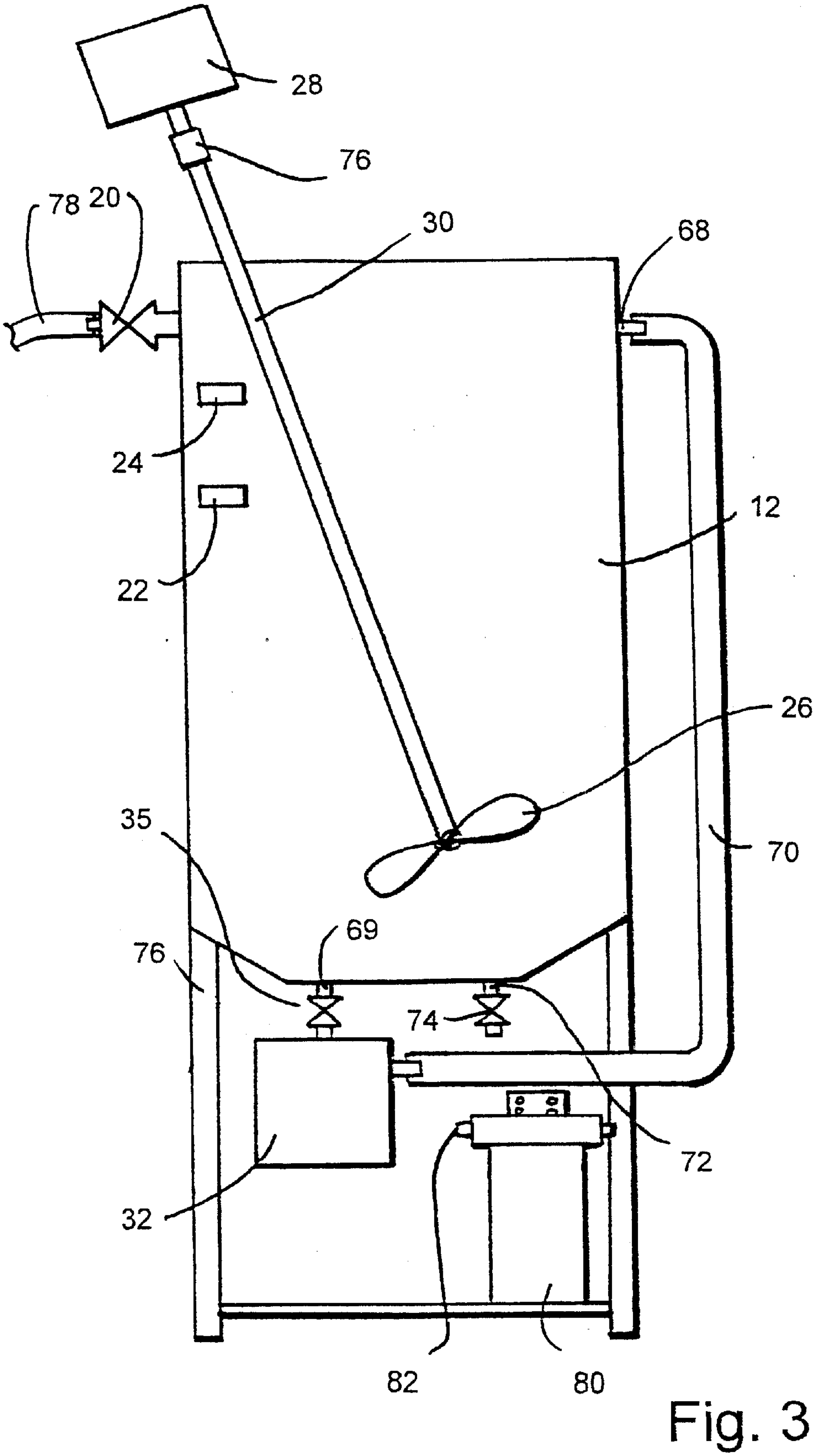
FIGS. 3 and 4 are schematic representations of the apparatus shown in FIG. 1.

Shown in FIG. 1 is a preferred embodiment of an apparatus 10. Apparatus 10 includes a tank or vessel 12 having an access port 14 which is coverable with a lid 16. A liquid inlet port 18 is provided to allow connection to a water source for filling vessel 12. A solenoid valve 20 is provided at the inlet port to regulate water flow from a source of water through the inlet port into the vessel. Solenoid valve 20 is bored internally to allow a high flow rate. Referring to FIG. 3, apparatus 10 includes a first sensing device 22 for detecting when the liquid has reached a predetermined lower liquid level, and a second sensing device 24 for detecting when the liquid has reached a predetermined upper liquid level. An agitator 26 and shaft 30 disposed within the vessel 12 are coupled with a motor 28 by way of coupler 76. A pump 32 is mounted on the apparatus 10. The primary function of pump 32 is to pump dialysis concentrate prepared in the apparatus to a holding vessel 34 (FIG. 4) for subsequent distribution and use. However, during mixing of powdered materials with water in vessel 12, pump 32 is operated to prevent accumulation of undissolved solids in pump 32 and plugging thereof During this time, fluid and any undissolved solids are recirculated from the bottom of the tank to the top of the tank. Such recirculation during mixing also helps accelerate the mixing process. A valve 35 (e.g., a ¾" PVC ball valve) is provided at the fluid egress point at the bottom of the tank 12. Valve 35 is normally open, but may be closed such as to prevent loss of dialysate concentrate or fluid precursors thereto in the event that nay components downstream of tank 12 are in need or repair or replacement.

A control panel 36 (FIGS. 1 and 2) is mounted on tank 12. Mounted on the face of control panel 36 is a main power switch 38, a pump control switch 40, an agitator control switch 42, a solenoid control switch 44, and a fill/reset button 46. A power-on indicator light 48 is also provided. Switches 38, 40 and 42 are on/off switches. Solenoid switch 44 is a three-position switch including a prefill position (left position), an off position (center) and a final fill position (right position).

Figure 2:
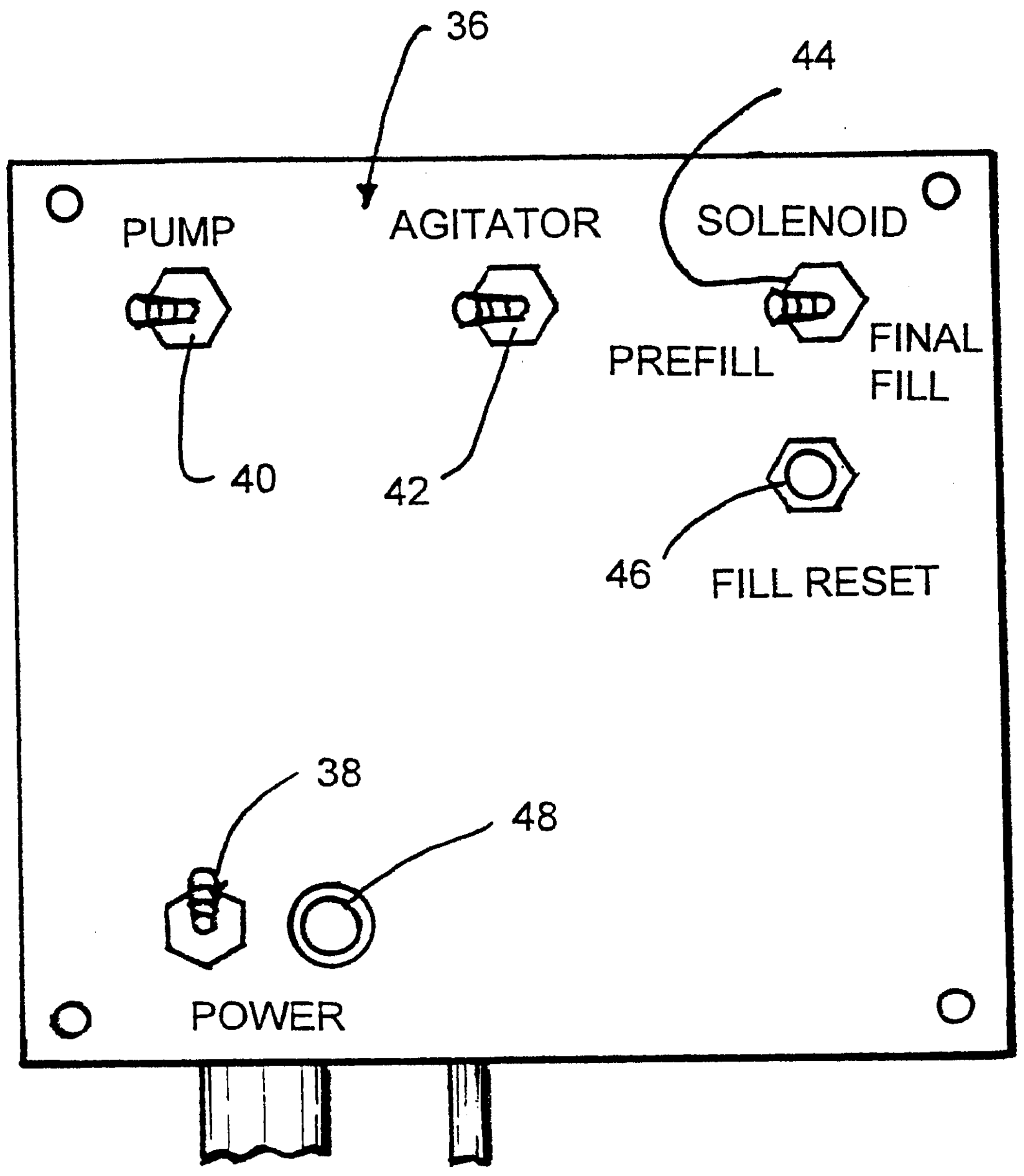
FIG. 2 is an enlarged view of the control panel for the apparatus shown in FIG. 1.
Figure 5:
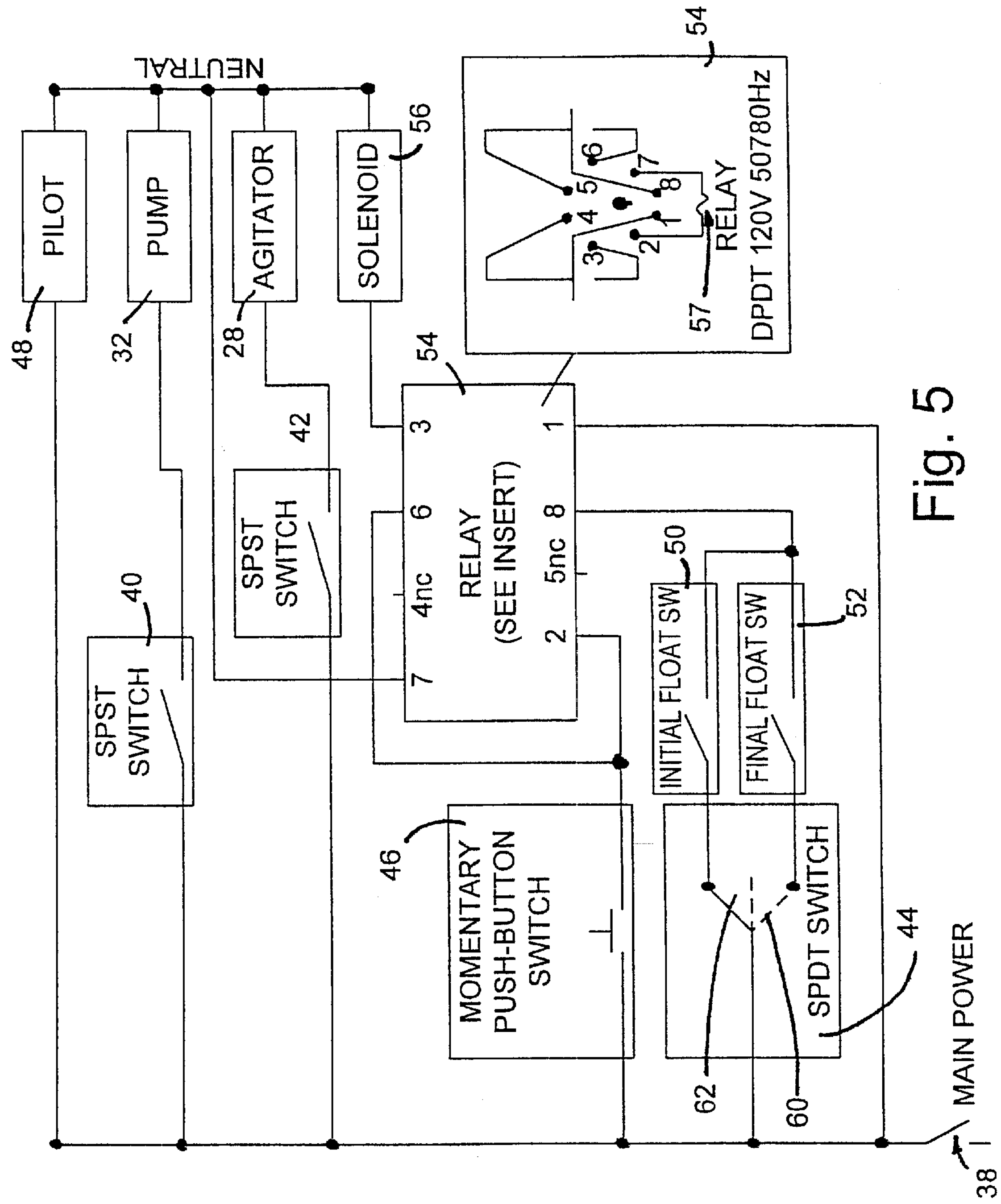
FIG. 5 is a schematic representation of the control circuitry for the apparatus shown in FIG. 1.

A schematic diagram of the electrical circuit for the apparatus is shown in FIG. 5. When main power switch 38 is closed (placed in the on position) power is supplied to light 48 mounted on control panel 36 to indicate that power is on. Switches 40 and 42 can be closed (placed in the on position) to supply power to pump 32 and agitator motor 28, respectively. When vessel 12 is empty, switches 50 and 52 are in the open position as shown in FIG. 5. When fill/reset button 46 is depressed, power is supplied to terminals 2 and 6 of relay 54. This causes current to flow through coil 57 to energize the relay causing terminal 1 of the relay to be electrically disconnected from terminal 4 and to be electrically connected to terminal 3; and causing terminal 8 of the relay to be electrically disconnected from terminal 5 and electrically connected to terminal 6. As a consequence, solenoid 56 is energized causing valve 20 to open and allow water to flow through inlet port 18 into vessel 12 when the inlet port is connected with a supply of water. During filling of vessel 12, sensing device 22 causes switch 50 to become closed when a lower predetermined liquid level is reached. When single-pole, double-throw solenoid switch 44 is in the prefill position as indicated in FIGS. 2 and 5, current is supplied to terminal 8 of relay 54 when switch 50 is in the closed position. This causes current to flow from terminal 6 and into terminal 2, which in turn causes the relay to unlatch, whereby terminal 1 is electrically reconnected with terminal 4 of relay 54, and terminal 8 is electrically reconnected with terminal 5 of relay 54. As a result, terminal 1 is no longer connected with terminal 3 of relay 54, and solenoid 56 is deactivated, whereby valve 20 is closed to prevent further flow of water into vessel 12. When single-pole, double-throw switch 44 is in the final fill position, indicated in dashed lines at 60, power is supplied to solenoid 56 by momentarily depressing push button 46. Solenoid 56 remains activated, and valve 20 remains open until sensing device 24 detects that the liquid level is at the predetermined upper limit. At that time, switch 52 is closed causing relay 54 to unlatch, whereby power is no longer supplied to solenoid 56. This causes valve 20 to close preventing water from entering vessel 12. When switch 44 is in the off position (center position), as indicated in dashed lines at 62, power can only be supplied to solenoid 56 while push button 46 is depressed. As soon as push button 46 is released, power is no longer supplied to solenoid 56, and valve 20 is closed.

Figure 4:
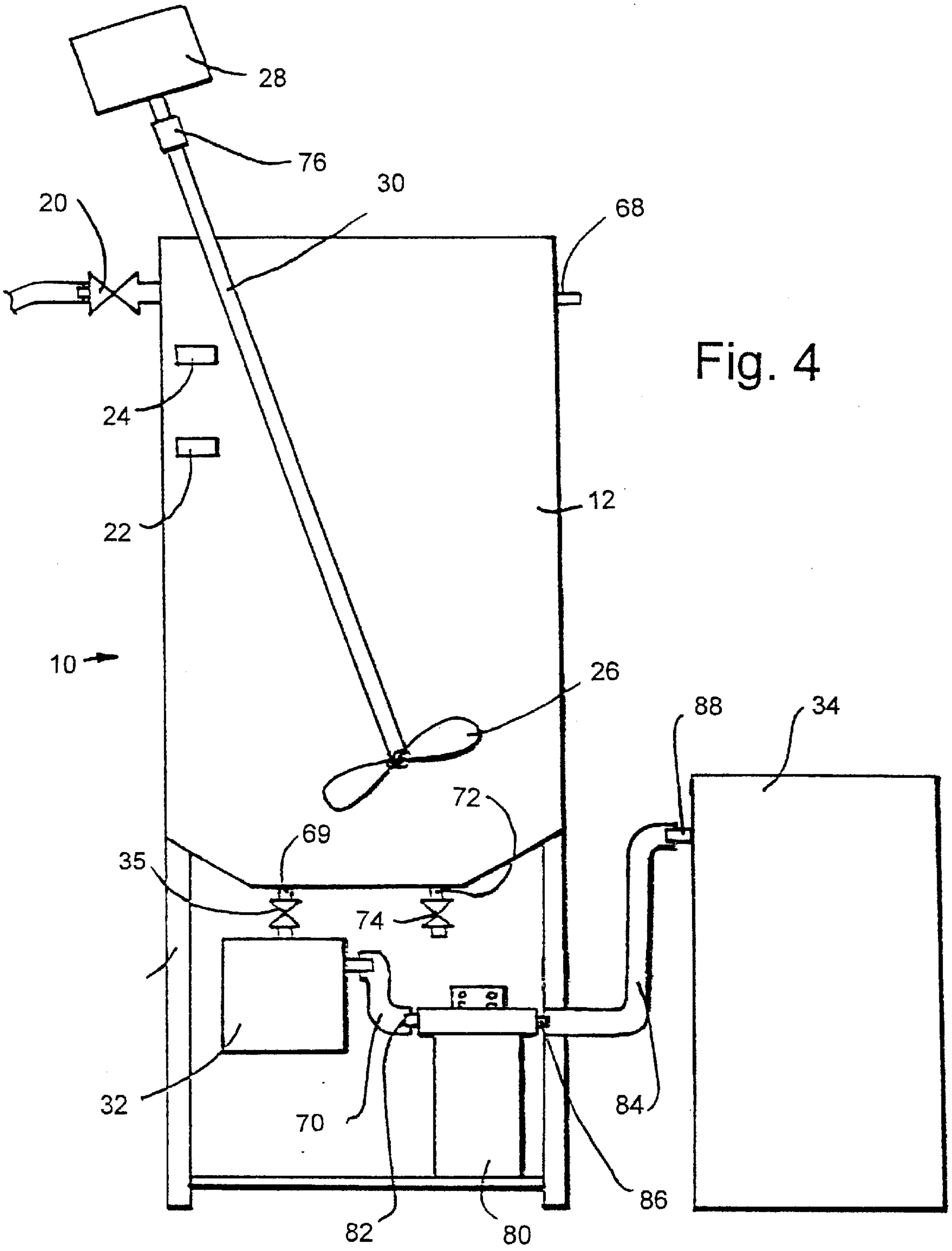

Power is supplied to apparatus 10 by a power cord 64 having a connector 66 which can be plugged into a standard 110/115 volt grounded electrical outlet. A recirculation port 68 is provided at or near the top of vessel 12 to allow fluid to be circulated from a fluid outlet 69 at or near the bottom of vessel 12, by pump 32, through conduit 70 (FIG. 3). The power cord to the motor of pump 32 is preferably routed through a wiring conduit 72 as shown in FIG. 1. Vessel 12 is provided with a drain 72, having a valve 74 (FIGS. 3 and 4).

Vessel 12 is preferably made of plastic such as high density polyethylene. Stand 74 is preferably made of 304 stainless steel. Agitator coupler 76, shaft 30 and propeller 26 are preferably made of 316L stainless steel. Control panel 36 is preferably made of polyvinylchloride and provides water-tight protection for electronic components. Delrin®, fiberglass or stainless steel bolts and screws are used to avoid rust.

A filter housing 80 containing a filter (not shown) is mounted on stand 74. Dialysate concentrate prepared in vessel 12 is pumped through filter housing 80, (and the filter contained therein) before being used to remove any particulate matter, such as small paper fibers which may come off of bags which contained the powdered materials used to prepare the dialysate concentrate, or other contaminants.

Dialysate concentrate can be quickly and easily prepared using the above described apparatus. Dialysate concentrate is prepared by starting with a clean vessel 12 which has been stored with drain valve 72 in the open position, and with access cover 16 on access opening 14 ajar. A water supply line 78 (FIG. 3) is securely connected to solenoid valve 20. Power cord 64 is connected with a standard 110/115 volt grounded outlet, and power switch 38 is placed in the on position. This will cause power indicator 48 to light up. Vessel 12 is filled by placing the solenoid switch in the prefill position (left position of control panel shown in FIG. 2) and momentarily depressing the fill/reset button 46. This causes water to enter the tank. Water continues to fill the tank until the level reaches the predetermined lower level sensor 22. When the liquid level reaches sensor 22, switch 50 (FIG. 5) closes, deactivating solenoid 56 and causing valve 20 to close. At this time, it is advisable to visually check the water level to insure that the apparatus is working properly. Thereafter, the agitator motor 26 is activated by moving switch 42 to the on position. Access cover 16 is then removed, and a liquid acetic acid solution is added to the vessel. With pump discharge line 70 attached at one end to pump 32 and at the other end to recirculation port 68, pump 32 is activated by moving switch 40 into the on position. Thereafter, a pre-measured amount of acid solution, and a pre-measured package of dry ingredients (typically comprising sodium chloride, potassium chloride, calcium chloride, magnesium chloride and dextrose) are slowly added to vessel 12. It is highly preferred to add the acid solution before the dry ingredients are added. The dry ingredients are preferably added slowly to prevent the pump from becoming clogged. A suitable acid solution is an acetic acid solution, but other acid solutions may be used, such as a citric acid solution. After the acetic acid solution and dry chemicals have been added, the agitator and recirculation pump should be allowed to operate for about one to two minutes. The use of a liquid acid solution is extremely advantageous because it reduces the amount of time needed to achieve a homogeneous dialysate mixture, and eliminates the possibility of having undissolved acid salts in the dialysate concentrate. Thereafter, the agitator and pump are turned off and solenoid switch 44 is moved to the final fill position. The fill/reset button is momentarily depressed to actuate solenoid 56 and open valve 20 to allow water to enter vessel 12. Water flows into vessel 12 until a predetermined upper liquid level is detected by sensing device 24. When this occurs, sensing device 24 causes switch 52 to close, deactivating solenoid 56 and closing valve 20. The chemicals added to vessel 12 are pre-packaged in predetermined amounts based on the final volume of the dialysate concentrate. The predetermined lower liquid level corresponds with an amount of water which is sufficient to dissolve most, if not all, of the chemicals added. The predetermined upper liquid level corresponds with the final volume which is needed to achieve the desired final concentrations of the chemicals added. If a malfunction or procedural error has occurred and the tank level is more than 5% above the prescribed level, the batch must be discarded. If the tank level is 5% or more below the prescribed level, the water level can be increased manually by depressing the fill/reset button 46 and holding it in until the water has reached the prescribed level.

After the water has reached the prescribed final level, agitator motor 28 and recirculation pump 32 are operated for about five minutes to allow all of the chemicals to completely dissolve and mix. Thereafter, the agitator and pump should be shut off and the solution should be allowed to set for two to five minutes to allow bubbles to dissipate. Thereafter, the solution should be visually inspected through the top access port for undissolved chemicals. If any undissolved chemicals are detected, the solution should be subjected to further agitation and reinspection.

Thereafter, the solution should be tested to insure that it has the appropriate specific gravity, pH and conductivity.

After the dialysate concentrate has been prepared in vessel 12, conduit 70 is disconnected from recirculation port 68 and connected to inlet port 82 of filter canister 80 (containing a filter), and a second conduit 84 is connected to outlet port 86 of filter housing 80 at one end, and to an inlet port 88 of a receiving vessel 34 at the other end, as shown in FIG. 4.

After the dialysate concentrate has been emptied into container 34 for distribution and use, apparatus 10 should be prepared for storage and/or reuse by turning off the pump and disconnecting conduit 84 from filter outlet 86. Drain valve 74 should be opened and the internal walls of vessel 12 should be rinsed with AAMI standard water. Thereafter, drain valve 74 should be closed and 10 to 15 gallons of water should be manually added. Next conduit 70 should be disconnected from inlet port 82 of filter housing 80 and connected with recirculation port 68 near the top of vessel 12. Pump 32 should be operated to rinse conduit 70. Thereafter, valve 74 should again be opened to allow vessel 12 to drain. When the tank is empty, pump 32 should be turned off. However, pump 32 should be shut off before it is run dry. The filter in filter housing 80 should be inspected for cleanliness. The filter may be rinsed in AAMI water to remove surface debris. If the filter appears dirty or flow from the filter outlet is diminished, the filter should be replaced. After the filter has been replaced in the filter housing, the filter housing should be filled with dialysate concentrate. This will prevent bacterial growth in the filter.

The above described apparatus can be configured for preparation of various batch sizes of dialysate concentrate, e.g., 25, 50, 75 or 100 gallon batches. The apparatus can be designed to occupy very little floor space, e.g., about 5.1 square feet. The apparatus can be utilized to prepare all currently acceptable concentrations which are in widespread use. The apparatus of this invention is simple to operate as compared with more complexed computer controlled systems and very complex hydraulic systems.

Batches can be prepared in approximately ten minutes. The storage space needed to hold four 55 gallon drums can hold sufficient acetic acid solution and dry powdered materials to prepare about twenty-two 55 gallon drums of dialysate concentrate. By using the apparatus and methods of this invention, the space normally used for storing empty drums is available for other purposes, because the packages containing the dry powdered materials and acetic acid used to prepare the dialysate concentrate may be discarded.

It will be apparent to those skilled in the art that various modifications and adaptations can be made to the present invention without departing from the spirit and scope of this invention. Thus, it is intended that the present invention cover the modifications and adaptations of this invention, provided they come within the scope of the appended claims and their equivalents.

What is claimed is:

1. An apparatus for preparing a dialysate concentrate for use in performing a dialysis procedure, comprising:

a vessel;

a liquid inlet port to the vessel;

a powder ingredient port to the vessel;

an automatically controllable valve for starting and stopping liquid flow through the inlet port to the vessel;

a first sensing device for detecting when liquid admitted to the vessel has risen to a predetermined lower liquid level therein;

a second sensing device for detecting when the liquid in the vessel has reached a predetermined upper liquid level;

a controller responsive to a selected one of the sensing devices for closing the automatically controllable valve when the selected one of the sensing devices detects that the liquid has reached the lower or upper liquid levels, respectively; and a switch for selecting to which of the sensing devices the controller is responsive.

2. The apparatus of claim 1 further comprising a liquid outlet at or near the bottom of the vessel; a recirculation port near the top of the vessel, a pump, and conduit for recirculating liquid from the liquid outlet to the recirculation port.

3. The apparatus of claim 1, wherein the vessel is made of plastic.

4. The apparatus of claim 1, wherein the vessel is made of high density polyethylene.

5. The apparatus of claim 1 further comprising a liquid outlet at or near the bottom of the vessel, a pump, a filter housing for containing a filter, and conduit for pumping dialysate concentrate from the liquid outlet of the vessel through the filter housing.

6. The apparatus of claim 1 further including an agitator inside said vessel and a control for actuating said agitator when the liquid within the vessel exceeds said lower liquid level.

7. A method for preparing a dialysate concentrate for use in performing a dialysis procedure, comprising the steps of:

providing an apparatus including a vessel, an agitator, a liquid inlet port to the vessel, an automatically controllable valve for controlling water flow through the inlet port into the vessel, a first sensing device for detecting when the liquid in the vessel has reached a predetermined lower liquid level, a second sensing device for detecting when the liquid in the vessel has reached a predetermined upper liquid level, a controller responsive to a selected one of the sensing devices for closing the automatically controllable valve when the selected one of the sensing devices detects that the liquid in the vessel has reached the lower or upper liquid levels respectively, and a switch for selecting to which of the sensing devices the controller is responsive;

connecting a source of water to the inlet port;

filling the vessel to the predetermined lower liquid level by using the switch to make the controller responsive to the first sensing device, opening the automatically controllable valve, and allowing the first sensing device to detect when the predetermined lower liquid level has been reached and in response signal the controller to close the automatically controllable valve;

adding a predetermined amount of powder and/or liquid to the vessel;

operating the agitator for a period of time to cause the added powder and/or liquid to dissolve into and/or mix with the water in the vessel to form a generally homogenous solution;

filling the vessel to a predetermined upper liquid level by using the switch to make the controller responsive to the second sensing device by opening the automatically controllable valve; and allowing the second sensing device to detect when the predetermined upper liquid level has been reached and in response signal the controller to close the automatically controllable valve.

8. The method of claim 7, wherein the step of adding a predetermined amount of powder and/or liquid to the vessel comprises adding a pre-measured amount of dry ingredients and a pre-measured amount of acid in liquid form.

9. The method of claim 8, wherein the acid is an acetic acid solution.

10. The method of claim 9, wherein the pre-measured dry ingredients include sodium chloride, potassium chloride, calcium chloride, magnesium chloride and dextrose.

11. The method of claim 8, wherein the acid solution is added to the contents of said vessel before at least some of the dry ingredients.

12. The method of claim 8, including the step of recirculating the liquid in said vessel from one location therein to another location therein to facilitate mixing of said powder and/or liquid with the water in said vessel.

13. The method of claim 12, wherein said step of recirculating said liquid comprises pumping the liquid from a lower level of said vessel to a higher level thereof.

14. The method of claim 13, wherein said step of recirculating is carried on at least partially during the operation of said agitator.

15. The method of claim 7, wherein the step of adding a predetermined amount of powder and/or liquid to the vessel is carried out manually at least in part.

* * * * *